Y. SAKAI.
ARMATURE WINDING.
APPLICATION FILED FEB. 3, 1910.

1,156,711.

Patented Oct. 12, 1915.
4 SHEETS—SHEET 1.

WITNESSES:
C. L. Belcher
Otto S. Schairer

INVENTOR
Yasudiro Sakai
By
ATTORNEY

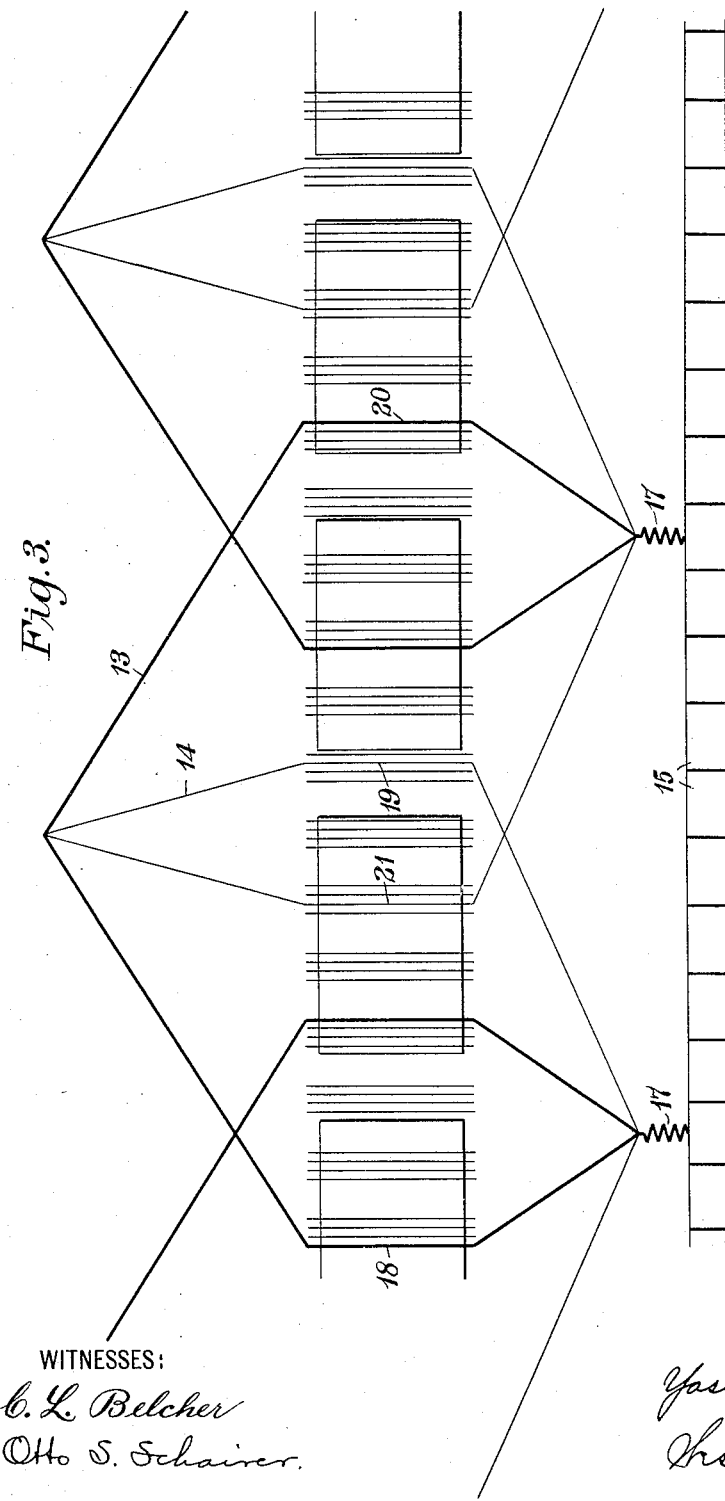

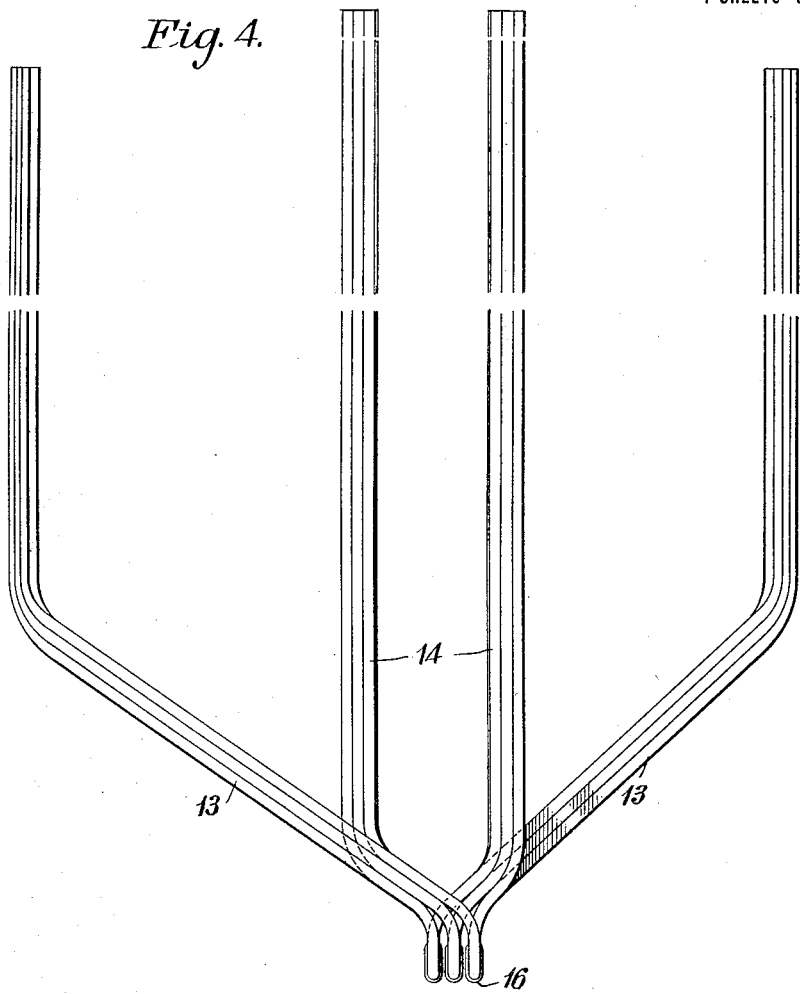
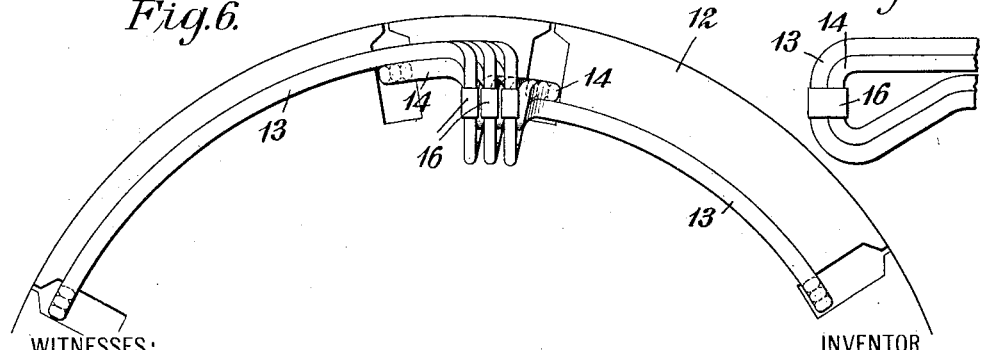

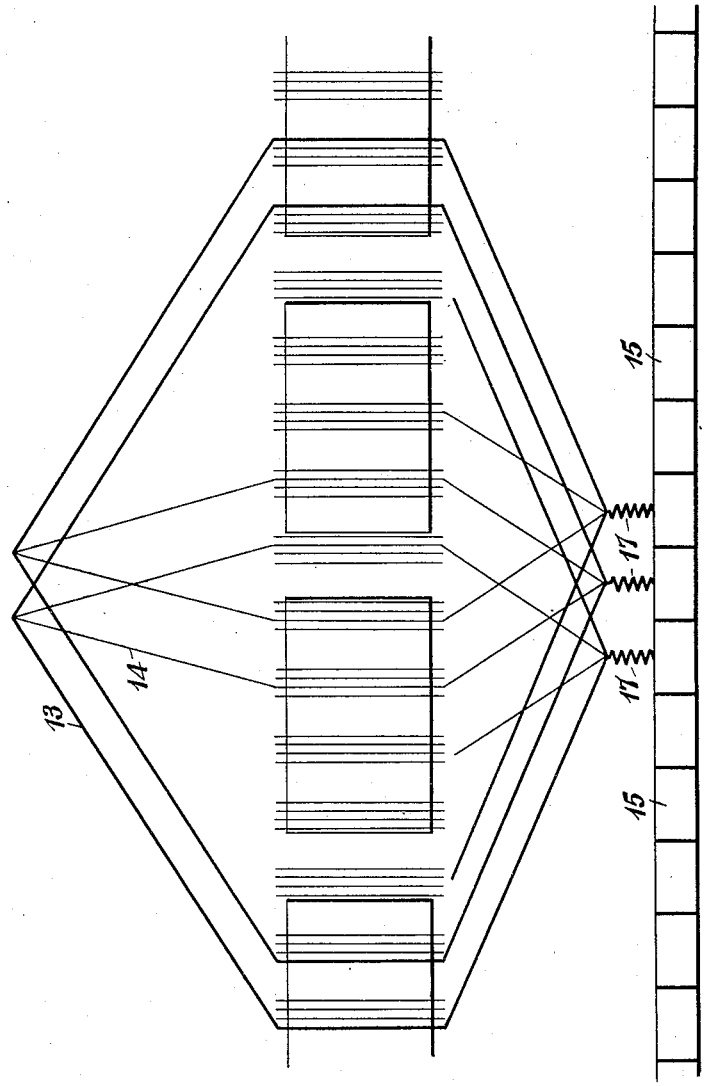

UNITED STATES PATENT OFFICE.

YASUDIRO SAKAI, OF EAST PITTSBURGH, PENNSYLVANIA, ASSIGNOR TO WESTINGHOUSE ELECTRIC AND MANUFACTURING COMPANY, A CORPORATION OF PENNSYLVANIA.

ARMATURE-WINDING.

1,156,711. Specification of Letters Patent. Patented Oct. 12, 1915.

Application filed February 3, 1910. Serial No. 541,850.

*To all whom it may concern:*

Be it known that I, YASUDIRO SAKAI, a citizen of the United States, and a resident of East Pittsburgh, in the county of Allegheny and State of Pennsylvania, have invented a new and useful Improvement in Armature-Windings, of which the following is a specification.

My invention relates to armature windings for single phase alternating current electric motors and particularly to windings for motors that are adapted to be started as commutating motors and to run at full speed as induction motors.

The object of my invention is to provide a winding for motors of the character above indicated that shall be more simple and economical in construction than others heretofore provided and shall also be exceptionally efficient in service.

It has heretofore been proposed to provide single phase alternating current motors with such armature windings that they may be started as commutating motors, with one number of field poles, and be operated at full speed as induction motors, with a smaller number of field poles. These windings have heretofore been provided with conductors that connect together points of normally equal potential when the motor has the larger number of poles and operates as a commutating motor, and that short circuit portions of such windings when the motor has the smaller number of poles and operates as an induction motor.

The present invention provides a winding in which no cross connections are employed between points of normally equal potential, but in which the proper circuits are provided for each condition of operation: that is, for each number of field poles.

Figure 1:
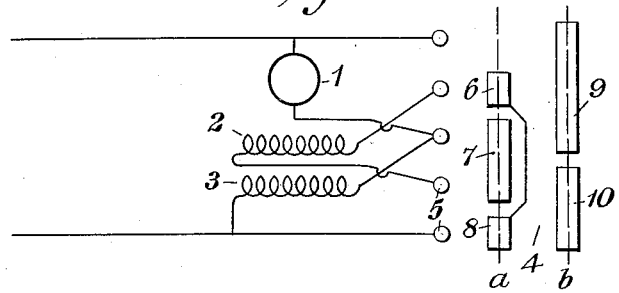
Figure 2:
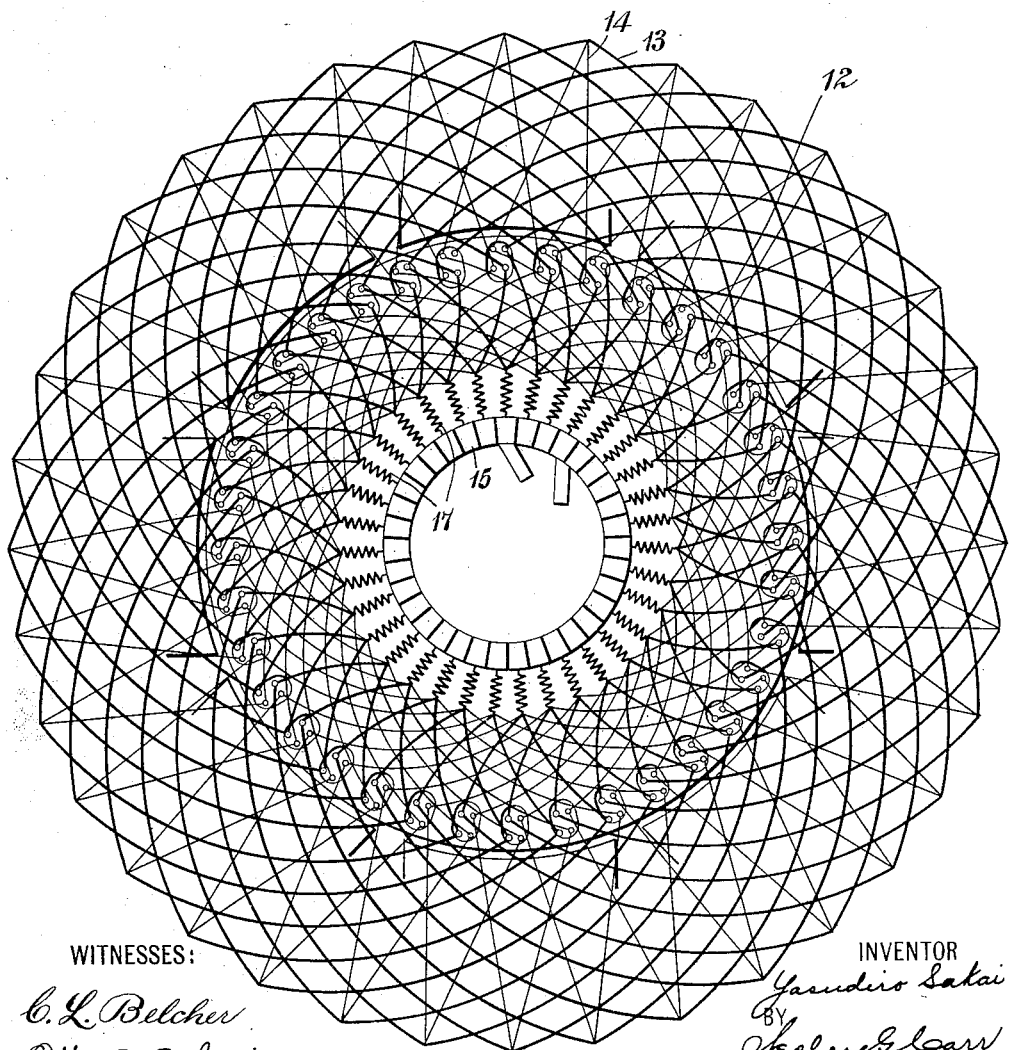

My invention is illustrated in the accompanying drawings, Figure 1 of which is a diagrammatic view of the circuits of a motor embodying the same. Fig. 2 is a diagramatic view of the armature of the machine. Fig. 3 is an enlarged diagrammatic view of a few of the coils of the armature winding. Fig. 4 is a plan view of two of the coils of the armature winding. Fig. 5 is a side view of the end portions of the coils of Fig. 4. Fig. 6 is an end view of the coils of Figs. 4 and 5, and Fig. 7 is a diagrammatic view of a few of the coils of a modified form of the winding.

The external circuit connections of a motor in which the present invention may be conveniently embodied are illustrated diagrammatically in Fig. 1, the said motor comprising an armature 1, and a field magnet winding having two parts 2 and 3 that may be connected in parallel relation by means of a controller 4. As illustrated, the controller 4 comprises a plurality of stationary contact terminals 5 and two sets of movable conducting segments 6, 7, 8, 9 and 10, the one set (6, 7 and 8) being located upon a broken position-indicating line *a*, and the other set (9 and 10) being located upon another position-indicating line *b*. When the controller segments upon the line *a* engage the stationary contact terminals 5, the circuits are connected for operation of the motor as a series motor, the two parts of the field magnet winding being then connected in parallel relation and in series with the armature. The circuit connections just described produce the larger number of field poles, which, in the case of the armature windings illustrated in Figs. 2, 3 and 7, is eight. When the segments 9 and 10 of the controller engage the stationary contact terminals 5, the armature 1 is short-circuited by the segment 9, and the two parts of the field magnet winding are again connected in parallel relation, but the part 2 is reversed with respect to the part 3, as compared with the relation of the said parts when the controller occupies the position *a*. Under these conditions, the motor operates as an induction motor, the number of field poles being reduced to four in the case of the armature windings of Figs. 2, 3 and 7.

The armature of the motor comprises a core member 12, having a plurality of peripheral slots in which are located two windings comprising, respectively, a plurality of formed coils 13 and 14. The pitches of the coils of the two windings differ very materially, the pitch of the coils 14 being much less than that of the coils 13. The two sets of coils occupy the same slots in the armature core, the conductors of the coils 13 occupying the outer and inner portions of the slots, while the conductors of the coils 14 occupy the intermediate portions thereof. Both sets of coils are connected, at one end of the armature, through resistance leads 17, to the segments 15 of a commutator cylinder and, at the other end, they are connected to each other by means of clips 16, or other suitable devices. In practice, the resistance leads 17 may not always be necessary. The coils of the two windings that are connected together and to the same commutator segments occupy different core slots and each coil 14 is located approximately centrally within the arc or pitch of the coils 13 to which they are connected. The arrangement of the connections of the coils, at the commutator end of the armature, is such that the extremities of the most remote side portions of the two coils are connected together, the leads from the coils 14 crossing each other in order to effect this result. The arrangement of the connections 16 is such that the two windings are connected to each other at corresponding intervals, at their ends remote from the commutator segments. That is, the connected points of the armature winding correspond to each other in several respects, namely, they are substantially the middle points of the coils, and they are adjacently located.

For the purpose of more readily explaining the invention, the machine illustrated in Figs. 2, 3 and 7 is provided with definite polar projections though, of course, it will be understood that the invention may also be employed in machines having distributed field windings and having no polar projections. With the larger number of field poles, that is, when the motor is started as a commutating motor, adjacent polar projections are of different polarity. Under these conditions, the conductor 18 of one of the coils 13 (Fig. 3), and the conductor 19 of one of the coils 14 are, at each instant, located in fields of the same polarity, and, accordingly, they constitute parallel conductors for the currents traversing them are in the same direction. The conductor 20 of the coil 13 and the conductor 21 of the coil 14 are also located, at each instant, in fields of the same polarity so that they, likewise, constitute parallel conductors for currents traversing them in the same direction. As the two sets of parallel conductors are connected together at their ends that are remote from the commutator, and as they are traversed in opposite directions by currents, they constitute a single armature coil when the motor has the larger number of poles and operates as a commutator motor. With the smaller number of field poles, adjacent polar projections constitute pairs of the same polarity, with the result that the conductors 18 and 19, respectively, of the coils 13 and 14 are, at each instant, located in fields of opposite polarity, so that they constitute parts of a closed-circuit coil in which currents tend to flow in opposite directions. Likewise, the conductors 20 and 21, respectively, of the coils 13 and 14, at each instant occupy fields of opposite polarity, and they, accordingly, also constitute a closed-circuit coil. This condition, of course, exists in each pair of connected coils, and a closed-circuit secondary winding is accordingly provided, so that the motor may operate as an induction motor with the smaller number of field poles.

Although the winding of Figs. 2 and 3 is a combination lap and wave winding, the invention is not limited in its application to windings of that specific type or form but may be applied generally in connection with windings of any type.

In Fig. 7, the invention is shown as applied to a pure lap winding, the principles of operation being the same as those which were explained in connection with the windings of Figs. 2 and 3, and the construction differs only to the extent of a different arrangement of the connections at the commutator end of the armature to provide for the overlapping adjacent coils.

While the invention has been shown and described as employed in a motor that starts as a series commutator motor, its application is not limited to such specific conditions, as the same armature winding may also be employed if the motor is started as a repulsion motor, or as any other type of commutator motor. It may also be employed in direct current motors, and in motors in which the number of field poles is not changed.

I claim as my invention:

1. An armature for dynamo-electric machines having two windings each comprising a plurality of coils, the coils of the respective windings being connected together in pairs both at their terminals and at intermediate points.

2. An armature for dynamo-electric machines comprising two windings each consisting of a plurality of coils, the coils of the respective windings being connected together in pairs both at their terminals and at intermediate points, and the terminal leads of one set of coils crossing each other.

3. An armature for dynamo electric machines having two windings, each of which comprises a plurality of coils, the coils of the respective windings being different in pitch and interconnected at each end of the armature.

4. An armature for dynamo-electric machines having two sets of coils of different pitch corresponding points of which are connected together only at each end of the armature.

5. An armature for dynamo electric machines having two windings each of which comprises a plurality of coils, the coils of one winding being respectively connected at each end of the armature to, and located within the arcs subtended by, the coils of the other winding.

6. In a dynamo-electric machine, the combination with a field magnet in which the number of poles may be changed, of a commutator and an armature having windings the conductors of which are connected in pairs at both extremities, one end of each pair of conductors being connected to a commutator segment, and the coils of the respective windings differing in pitch.

7. In a dynamo electric machine, the combination with a field magnet in which the number of poles may be changed, of a commutator and an armature having windings the conductors of which are connected in pairs at both extremities to constitute parallel circuits with one number of field poles and closed-circuit coils with the other number of field poles, the connected conductors being located in different parts of the armature, and one end of each pair of conductors being connected to a commutator segment.

8. In a dynamo electric machine, the combination with a field magnet in which the number of poles may be changed, of a commutator and an armature having windings the conductors of which are connected in pairs at both extremities, the connected conductors being located in different parts of the armature, one end of each pair of conductors being connected to a commutator segment.

9. In a dynamo electric machine, the combination with a commutator and a slotted armature core, of windings for said core the conductors of which are connected in pairs at both extremities, the connected conductors being located in different core slots, and one end of each pair being connected to a commutator segment.

10. An armature for dynamo-electric machines comprising a commutator cylinder and two windings each consisting of a plurality of coils, the coils of the respective windings being connected together in pairs both at their terminals and at intermediate points, and the terminals being connected to the commutator cylinder.

In testimony whereof, I have hereunto subscribed my name this 28th day of Jan., 1910.

YASUDIRO SAKAI.

Witnesses:
HAROLD B. GAYLOR,
B. B. HINES.

Copies of this patent may be obtained for five cents each, by addressing the "Commissioner of Patents, Washington, D. C."